United States Patent
Liu et al.

(10) Patent No.: US 10,234,849 B2
(45) Date of Patent: Mar. 19, 2019

(54) NUMERICAL CONTROLLER

(71) Applicant: FANUC CORPORATION, Minamitsuru-gun, Yamanashi (JP)

(72) Inventors: Zhaojia Liu, Yamanashi (JP); Yorikazu Fukui, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 15/866,751

(22) Filed: Jan. 10, 2018

(65) Prior Publication Data

US 2018/0203433 A1 Jul. 19, 2018

(30) Foreign Application Priority Data

Jan. 19, 2017 (JP) .................. 2017-007904

(51) Int. Cl.
*G05B 19/41* (2006.01)
*G05B 19/418* (2006.01)
*G05B 19/408* (2006.01)

(52) U.S. Cl.
CPC ........... *G05B 19/41* (2013.01); *G05B 19/408* (2013.01); *G05B 19/418* (2013.01)

(58) Field of Classification Search
CPC .................. G05B 19/41; G05B 19/416; G05B 19/40937; G05B 19/25; G05B 19/408; G05B 19/418; B23Q 15/22; B23Q 3/15503
See application file for complete search history.

(56) References Cited

U.S. PATENT DOCUMENTS

| 4,967,127 | A | * | 10/1990 | Ishiguro | B25J 13/085 318/570 |
|---|---|---|---|---|---|
| 5,136,224 | A | * | 8/1992 | Matsuura | G05B 19/4207 318/571 |
| 5,485,069 | A | * | 1/1996 | Otsuki | G05B 19/408 318/570 |
| 5,654,618 | A | * | 8/1997 | Roper | G05B 19/4061 318/571 |
| 7,099,772 | B2 | * | 8/2006 | Hayot | G01C 21/343 340/995.19 |
| 9,606,528 | B2 | * | 3/2017 | Uesugi | G05B 19/416 |
| 2009/0230910 | A1 | * | 9/2009 | Hishikawa | B21D 24/02 318/591 |
| 2010/0244762 | A1 | * | 9/2010 | Mori | B23Q 17/22 318/632 |
| 2018/0096597 | A1 | * | 4/2018 | Mortazavi | G01C 21/3415 |

FOREIGN PATENT DOCUMENTS

| JP | 2000-089814 A | 3/2000 |
| JP | 2005-004254 A | 1/2005 |

\* cited by examiner

*Primary Examiner* — Bentsu Ro
*Assistant Examiner* — Thai Dinh
(74) *Attorney, Agent, or Firm* — RatnerPrestia

(57) ABSTRACT

A numerical controller first creates a shortest path which does not interfere with an interfering object and shortens a movement distance from a start point to a cutting start position, and then, creates one or more alternative paths having a smaller number of break points than the shortest path when determining a movement path of a tool from the start point to the cutting start position. Then, each of a movement time along the shortest path and a movement time along the alternative path is calculated, and the alternative path having the shorter movement time than the shortest path is determined as the movement path.

3 Claims, 7 Drawing Sheets

NUMERICAL CONTROLLER

CROSS-REFERENCE TO RELATED APPLICATIONS

This application is a new U.S. Patent Application that claims benefit of Japanese Patent Application No. 2017-007904, filed Jan. 19, 2017 the disclosure of this application is being incorporated herein by reference in its entirety for all purposes.

BACKGROUND OF THE INVENTION

1. Field of the Invention

The present invention relates to a numerical controller, and particularly, to a numerical controller capable of creating a tool path that avoids interference while taking a movement time into consideration.

2. Description of the Related Art

When performing cutting, it is necessary to first move a tool to a start position or a restart position of cutting. A numerical controller determines such a movement path and performs a process of moving the tool according to the movement path.

Conventional techniques for determining a movement path of a tool are disclosed in Japanese Patent Application Laid-Open No. 2005-004254 and Japanese Patent Application Laid-Open No. 2000-089814. Both of those patent documents describe a method of determining a path, obtained by combining a path to actually perform machining and a path only to feed a tool without performing machining, such that total machining time becomes as short as possible.

However, any of those patent documents does not disclose a method of determining a path at the time of moving a tool to a start position or a restart position of cutting prior to start of cutting.

A method of selecting a path (shortest path) that minimizes a movement distance of a tool while avoiding interference with a workpiece is conceivable as the method of determining the tool movement path to the start position or the restart position of cutting as illustrated in FIG. 1. In such a method, however, the influence on a movement time caused by acceleration/deceleration of the tool is not considered. That is, when a break point is included in the movement path of the tool, acceleration/deceleration is performed before and after the breakpoint. The larger the number of breakpoints becomes, the longer the movement time becomes. Thus, when the shortest path (a tool path 1 indicated by the solid line) including a large number of break points is compared with another path (a tool path 2 indicated by the broken line) including a small number of break points as illustrated in FIG. 2, there may be a case where the movement time is shorter in the tool path 2 (by $\Delta T$). Therefore, when determining the movement path of the tool it is preferable to select a movement path that minimizes the movement time even if the movement path is long in terms of improving machining efficiency, instead of simply selecting the shortest path that can avoid interference.

SUMMARY OF THE INVENTION

The present invention has been made to solve such a problem, and an object thereof is to provide a numerical controller capable of creating a tool path that avoids interference while taking a movement time into consideration.

A numerical controller according to the present invention is configured to determine a movement path of a tool from a start point to a cutting start position or restart position, and includes: a shortest-path creation unit that creates a shortest path, optimized so as not to interfere with an interfering object and to shorten a movement distance from the start point to the cutting start position or restart position; an alternative path creation unit that creates one or more alternative paths having a smaller number of break points than the shortest path; and a movement time prediction unit that calculates movement times along the shortest path and the alternative path, respectively. Then, the alternative path creation unit further determines the alternative path having the shorter movement time than the shortest path as the movement path.

The alternative path creation unit may determine, as the movement path, the alternative path having the shortest movement time among the alternative paths each of which has the shorter movement time than the shortest path.

The alternative path creation unit may perform an interference check between the alternative path and the interfering object and determine, as the movement path, the alternative path that has the shorter movement time than the shortest path and does not interfere with the interfering object.

According to the present invention, it is possible to provide a numerical controller capable of creating a tool path that avoids interference while taking the movement time into consideration.

DETAILED DESCRIPTION OF THE PREFERRED EMBODIMENTS

Figure 1:
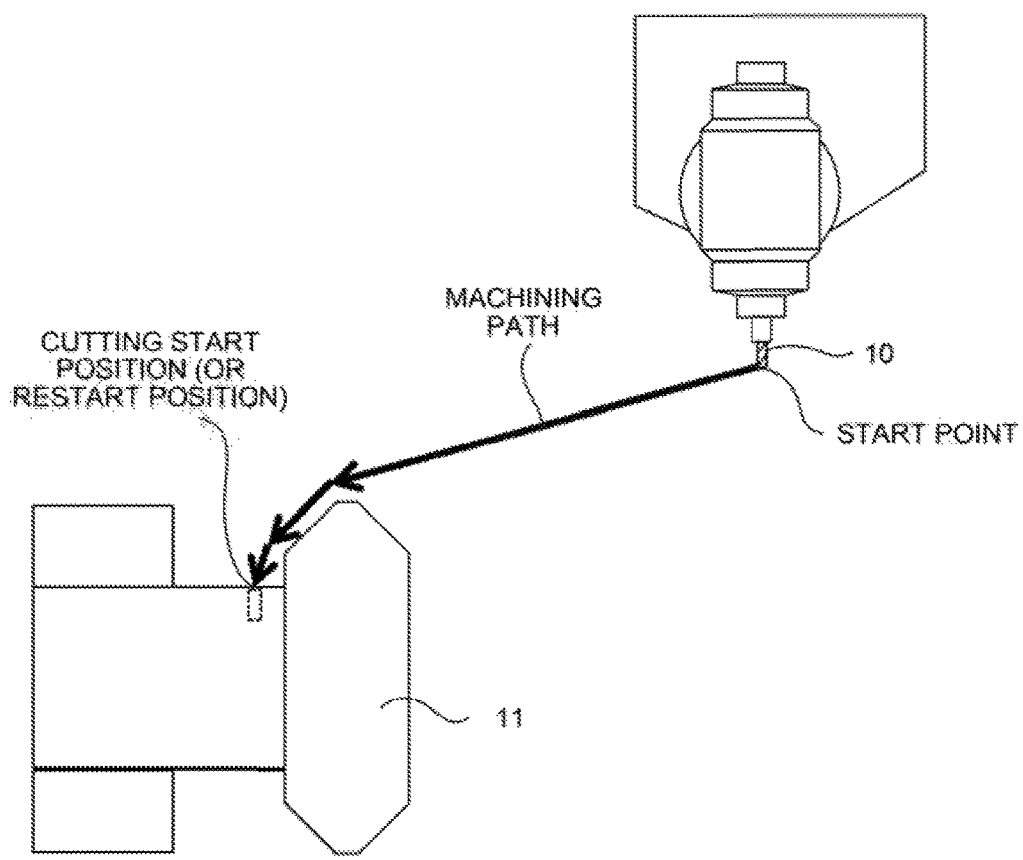
FIG. 1 is a view illustrating an example of a method of determining a tool movement path.
Figure 2:
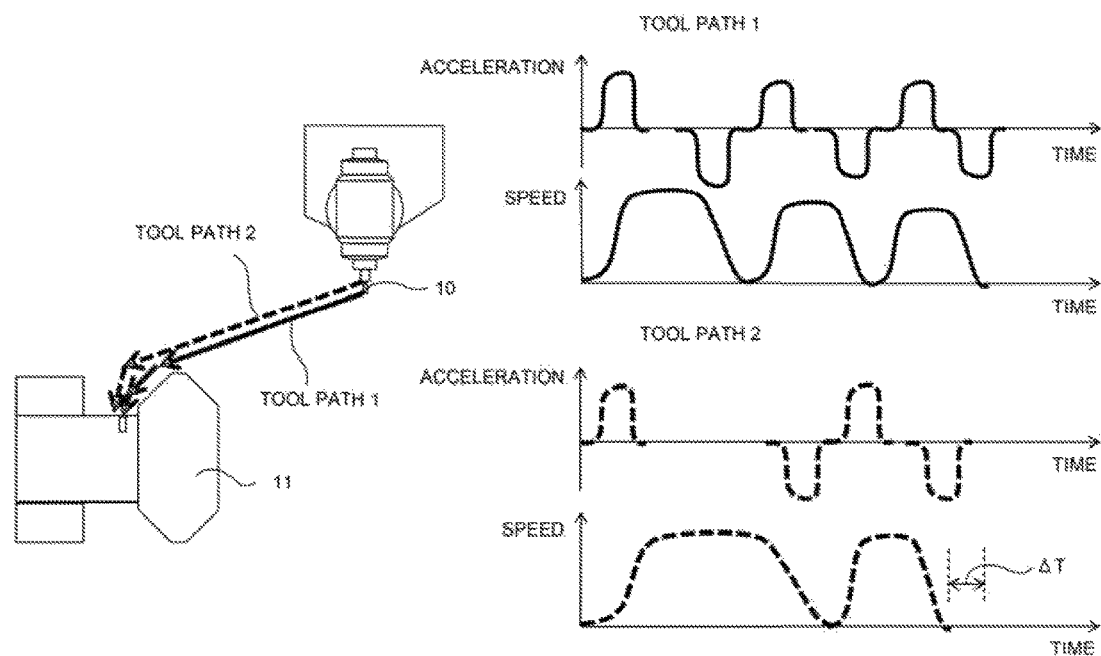
FIG. 2 is a view for describing that a movement time becomes shorter in a path which is not the shortest but has a smaller number of break points than in a path which is the shortest but has a larger number of break points.
Figure 3:
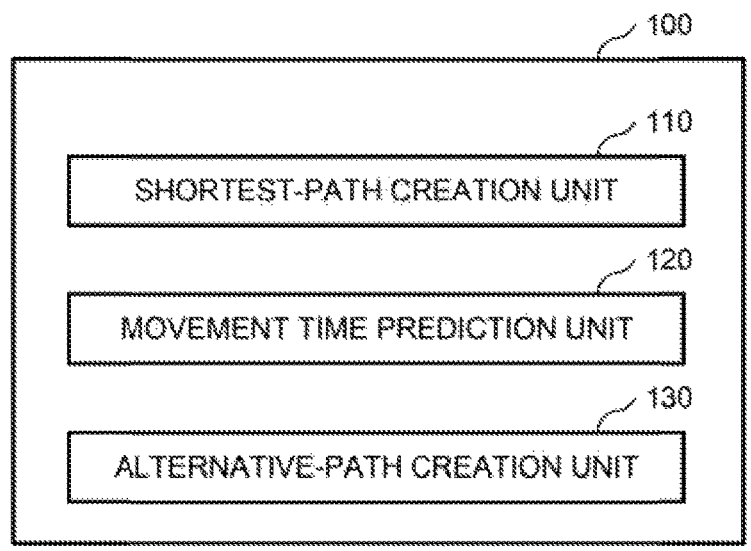
FIG. 3 is a block diagram illustrating a configuration of a numerical controller according to one embodiment of the present invention.

FIG. 3 is a block diagram illustrating a configuration of a numerical controller 100 according to an embodiment of the present invention.

The numerical controller 100 includes a shortest-path creation unit 110, a movement time prediction unit 120, and an alternative-path creation unit 130. The numerical controller 100 is typically an information processing apparatus that includes a central processing unit (CPU), a storage device, and an input/output device, and logically implements the above-described various processing units by causing the CPU to execute a predetermined program.

The shortest-path creation unit 110 creates a movement path for moving a tool 10 from a start point to a cutting start position or restart position while avoiding interference with an interfering object such as a workpiece 11. This movement path is a path optimized such that a movement distance becomes as short as possible. Hereinafter, this movement path will be referred to as a shortest path. Since this process of creating the shortest path has been conventionally known, a detailed description thereof will be omitted here.

The movement time prediction unit 120 simulates movement of the tool 10 based on the created movement path and performs a process of predicting a movement time. The movement time prediction unit 120 calculates the movement time also considering acceleration/deceleration at a breakpoint. Since this process of predicting the movement time has also been conventionally known, a detailed description thereof will be omitted here.

The alternative-path creation unit 130 creates one or more paths (alternative paths) having a smaller number of break points than the shortest distance created by the shortest-path creation unit 110, and predicts the movement time of each alternative path using the movement time prediction unit 120. Then, if finding an alternative path having the shorter movement time than the shortest path, this alternative path is output.

The operation of the numerical controller 100 illustrated in FIG. 3 will be described with reference to a flowchart of FIG. 4.

Figure 5:
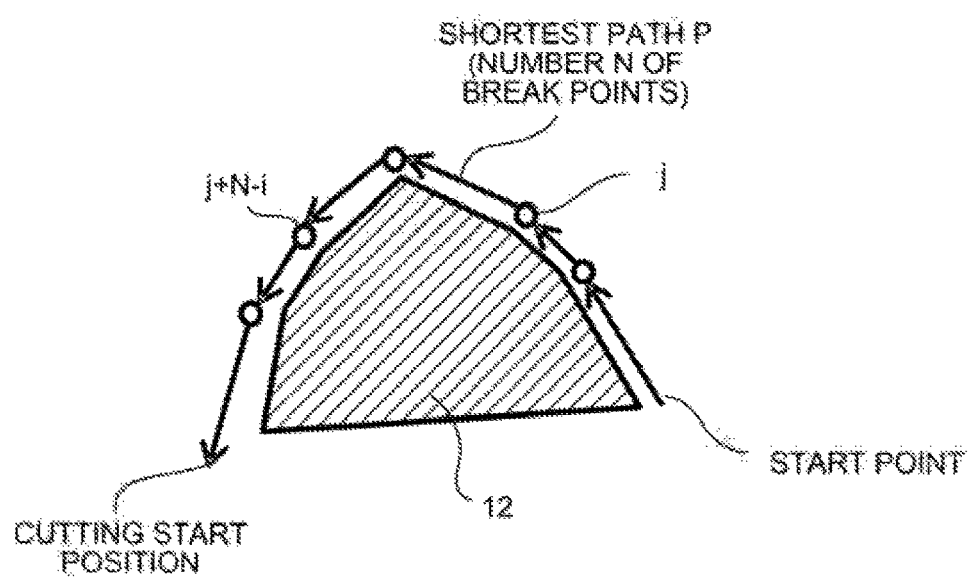
FIG. 5 is a schematic view illustrating a process of creating an alternative path Q.

Step S101: The shortest-path creation unit 110 creates a shortest path P for tool movement from the start point to the cutting start position or restart position that can avoid interference with an interfering object 12 (FIG. 5). Here, the number of break points included in the shortest path P will be denoted by N.

Step S102: The movement time prediction unit 120 calculates a movement time T of the shortest path P created in Step S101. The movement time T is a movement time obtained by also considering acceleration/deceleration at the break point.

Step S103 and Step S104: The alternative-path creation unit 130 starts creating an alternative path Q. First, creation of the alternative path Q having the number of break points smaller by one than that of the shortest path P is attempted (N−1). Meanwhile, when the number of break points of the shortest path P is one, the processing is ended at this point in time, because it is impossible to create the alternative path Q capable of avoiding interference.

Step S105: The alternative-path creation unit 130 creates the alternative path Q having a predetermined number i of break points. A specific creation procedure will be described later. The alternative path Q created here may be plural.

Step S106: The movement time prediction unit 120 calculates a movement time $T_M$ for the alternative path Q created in Step S105.

Step S107 and Step S108: The alternative-path creation unit 130 temporarily stores a movement time $T_M$ and the movement path Q when the movement time $T_M$ of the alternative path Q calculated in Step S106 is shorter than the movement time T of the shortest path P ($T>T_M$). Incidentally, when the plurality of alternative paths Q have been created in Step S105 and there are a plurality of the movement times $T_M$ shorter than the movement time T of the shortest path P, the shortest one of the movement times $T_M$ and the alternative path Q corresponding to the shortest movement time $T_M$ are temporarily stored.

Step S109: The processes of Steps S105 to S108 are repeated until whole of the paths Q having number i of break points are obtained.

Step S110 and Step S111: The alternative-path creation unit 130 attempts to create an alternative path having the number (i−1) of break points smaller by one than the number i of break points of the alternative path Q created in Step S105. That is, the number of break points is set to i−1, the processing returns to Step S105, and the processes of Step S105 and the subsequent steps are executed again. Meanwhile, when the number of break points of the alternative path Q created in Step S105 is one, the processing is ended at this point in time, because it is impossible to create an alternative path which has the number of break points smaller than one and is capable of avoiding interference.

After a series of processes described above are completed, the alternative-path creation unit 130 outputs the temporarily stored movement time $T_M$ and movement path Q. The numerical controller 100 can move the tool from the start point to the cutting start position or restart position based on the output movement path Q.

Figure 4:
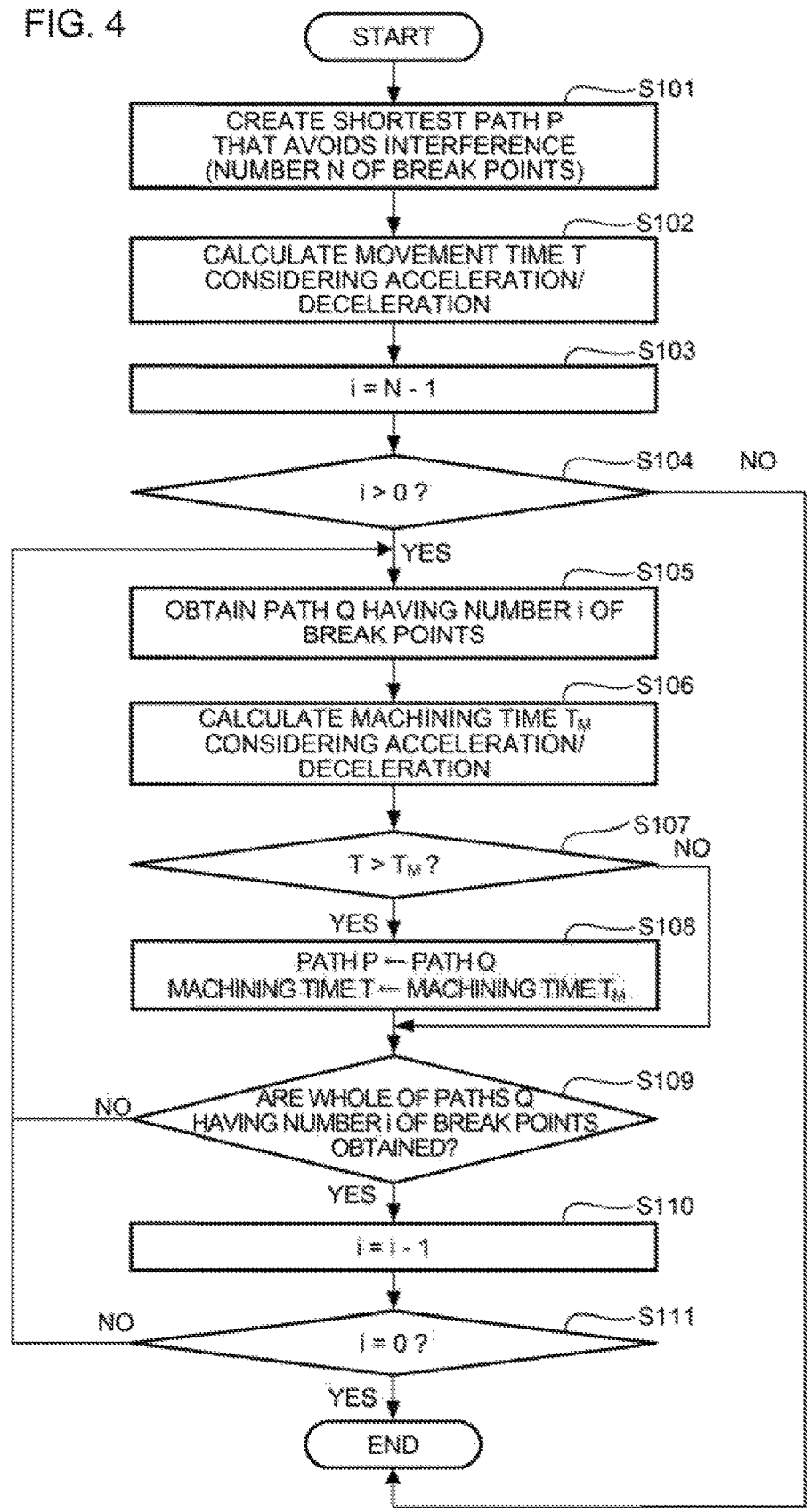
FIG. 4 is a flowchart illustrating an operation flow of the numerical controller illustrated in FIG. 3.
Figure 6:
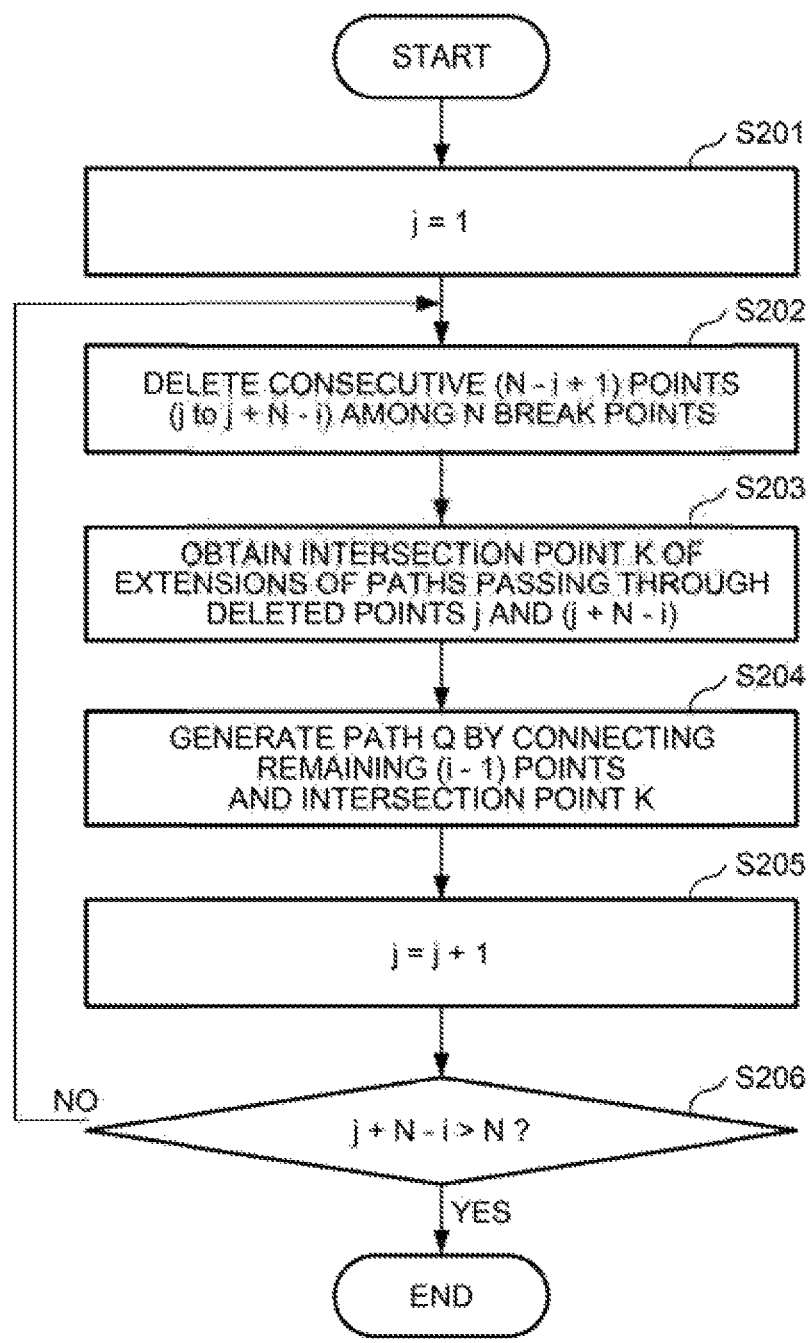
FIG. 6 is a flowchart illustrating the process of creation the alternative path Q.

FIG. 6 is a flowchart specifically illustrating the process of creating the alternative path Q having the number i of break points based on the shortest path P having the number N of break points described in the Step S105 of the flowchart of FIG. 4.

Step S201: A variable j is initialized. Here, j is a variable for designating any point in the shortest path P at which a process of reducing the number of break points is performed.

Figure 7A:
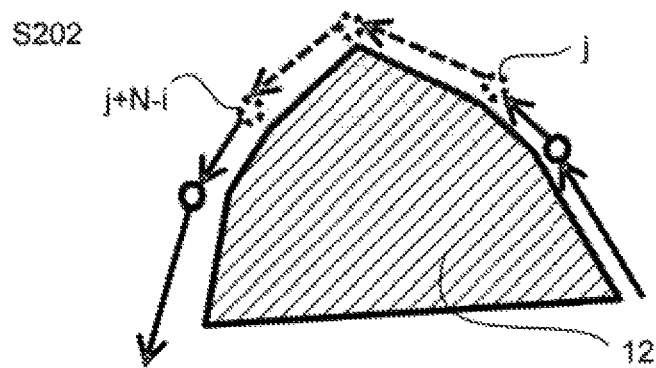
FIGS. 7A to 7C are schematic views illustrating the process of creating the alternative path Q.

Step S202: Consecutive (N−i+1) break points among N break points included in the shortest path P are deleted as illustrated in FIG. 7A. That is, the j-th to (j+N−i)-th break points from the start point are deleted.

For example, when j=2 is designated and a path in which the number i of break points is three is created from a path in which the number N of break points is five as indicated by the dotted line in FIG. 7A, three break points from the second (j=2) to fourth (j+N−i=2+5−3=4) break points are deleted.

Figure 7B:
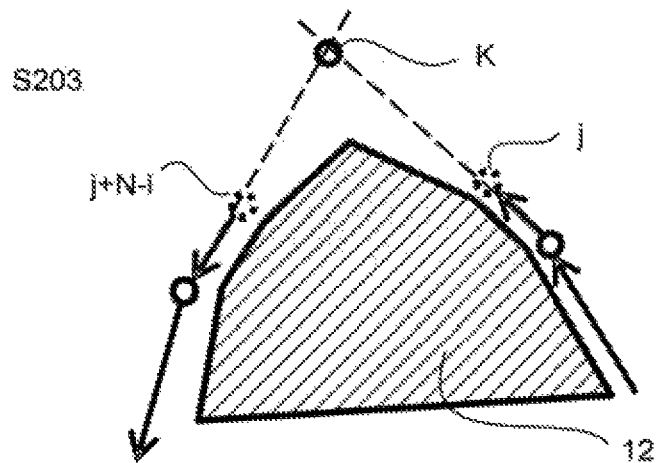

Step S203: An end point on the j-th break point side of a line segment, which have both ends at the deleted j-th break point and at a break point, the start point, or a cutting start point that is not deleted and adjacent to the j-th break point, is extended as illustrated in FIG. 7B. Similarly, an end point on the (j+N−i)-th break point side of a line segment, which have both ends at the deleted (j+N−i)-th break point and at a break point, the start point, or the cutting start point that is not deleted and adjacent to the (j+N−i)-th break point, is extended. Then, an intersection point K of the extended two line segments is obtained.

For example, when j=2 is designated and a path in which the number i of break points is three is created from a path in which the number N of break points is five as indicated by the dotted line in FIG. 7B, a line segment whose end points are the second (j=2) break point and the first break point which has not been deleted is extended. Further, a line segment whose end points are the fourth (j+N−i=2+5−3=4) break point and the fifth break point that has not been deleted is extended. The intersection point of these two line segments is K.

Figure 7C:
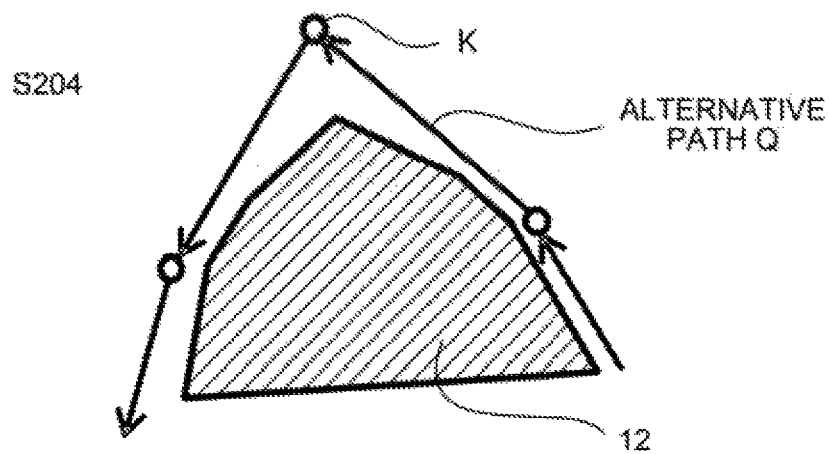

Step S204: The intersection point K and each of the break point, the start point, or the cutting start point that is not deleted and adjacent to the j-th break point, and the break point, the start point, or the cutting start point that is not deleted and adjacent to the (j+N−i)-th break point are connected as illustrated in FIG. 7C. As a result, the alternative path Q having the number i of break points is created.

For example, when j=2 is specified, a path in which the number i of break points is three is created from a path in which the number N of break points is five as indicated by the solid line in FIG. 7C, and the second (in the case of j=2) break point to the fourth (j+N−i=2+5−3=4) break point have been deleted, each of the first breakpoint and the fifth break point which have not been deleted is connected to the intersection point K. As a result, it is possible to create the path in which the number of break points are three.

In Step S205 and Step S206: The variable j is increased (j←j+1)), and the processes of Step S202 and the subsequent steps are repeated until j+N−i>N.

According to the present embodiment, the numerical controller 100 creates the alternative path Q having the smaller number of break points than the shortest path P, and outputs the alternative path Q when the movement time along the alternative path Q is shorter than the movement time along the shortest path P. The alternative path Q has the longer movement distance than the shortest path P, but has the shorter movement time obtained by considering acceleration/deceleration than the shortest path P. As a result, it is possible to shorten the movement time from the start point to the cutting start position or restart position. In addition, it is possible to expect extension of life of a motor due to a decrease in the number of times of acceleration/deceleration, suppression of power consumption, and the like.

Figure 8:
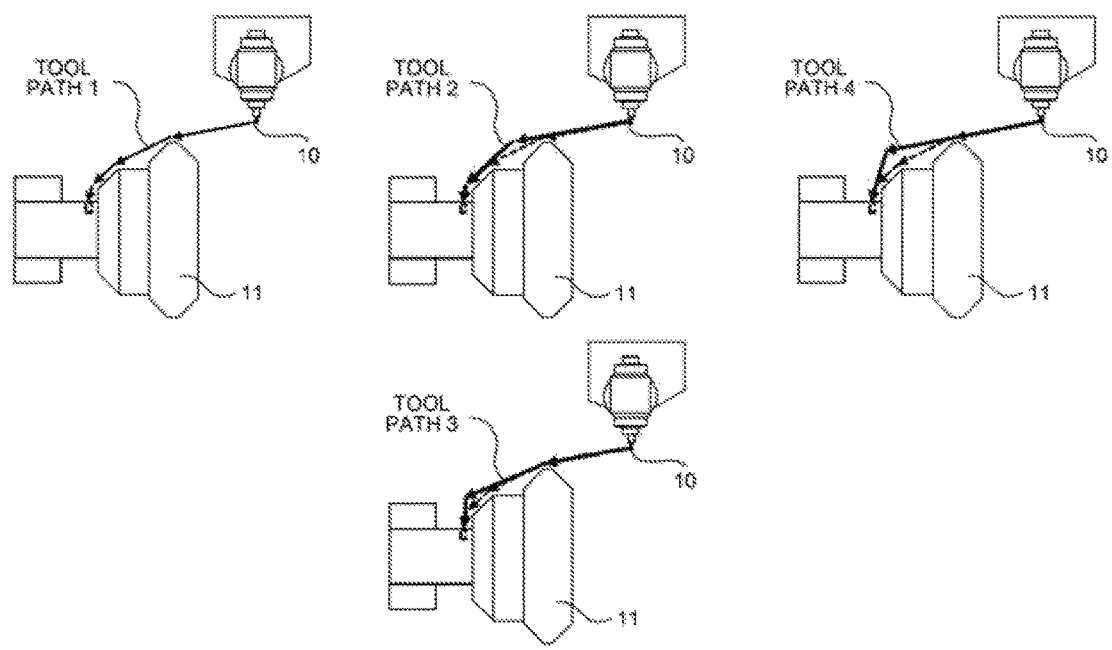
FIG. 8 is a schematic view illustrating an example of determination of the movement path of the tool according to the present invention.

FIG. 8 illustrates an example of determination of the movement path of the tool according to the present invention. It is assumed that a path (a tool path 1) having three break points is the shortest path P created by the shortest-path creation unit 110. At this time, the alternative-path creation unit 130 creates two patterns of paths (a tool path 2 and a tool path 3) having two break points and one pattern of path (a tool path 4) having one break point as the alternative paths Q. Then, the movement time prediction unit 120 evaluates each movement time of the tool paths 1 to 4. As a result of the evaluation, a path with the shortest movement time is adopted as the movement path from the start point to the cutting start position or restart position.

Incidentally, the present invention is not limited to the above-described embodiments and can be appropriately changed within a scope not departing from a spirit of the invention. The present invention can modify arbitrary constituent elements of the embodiments or omit arbitrary constituent elements of the embodiments within the scope of the invention.

For example, the alternative-path creation unit 130 may perform the process of checking interference between the interfering object 12 and the alternative path Q by a known technique for each of the alternative paths Q created in the above-described embodiment. Then, the alternative path Q in which the interference has been confirmed is excluded from a processing target. As a result, it is possible to eliminate the possibility that a workpiece having a complicated shape, a machine tool, or the like interferes with the alternative path Q. Typically, the interference checking process described above can be performed in Step S105, Step S108, or the like.

In addition, the alternative-path creation unit 130 outputs the alternative path Q having the shorter movement time than the shortest path P and the shortest movement time among the alternative paths Q as the movement path when there are the plurality of alternative paths Q in the above-described embodiment. However, one of the alternative paths Q having a shorter movement time than the shortest path P may be selected based on an arbitrary selection criterion and output as the movement path.

The invention claimed is:

1. A numerical controller that determine a movement path of a tool from a start point to a cutting start position or restart position, the numerical controller comprising:
   a shortest-path creation unit that creates a shortest path, optimized so as not to interfere with an interfering object and to shorten a movement distance from the start point to the cutting start position or restart position;
   an alternative-path creation unit that creates one or more alternative paths having a smaller number of break points than the shortest path; and
   a movement time prediction unit that calculates movement times along the shortest path and the alternative path, respectively,
   wherein the alternative-path creation unit further determines the alternative path having the shorter movement time than the shortest path as the movement path.

2. The numerical controller according to claim 1, wherein the alternative-path creation unit determines, as the movement path, the alternative path having the shortest movement time among the alternative paths each of which has the shorter movement time than the shortest path.

3. The numerical controller according to claim 1, wherein the alternative-path creation unit performs an interference check between the alternative path and the interfering object and determines, as the movement path, the alternative path that has the shorter movement time than the shortest path and does not interfere with the interfering object.

* * * * *